United States Patent [19]

Peters et al.

[11] Patent Number: 5,202,616
[45] Date of Patent: Apr. 13, 1993

[54] BIPOLAR OR UNIPOLAR DRIVE BACK-EMF COMMUTATION SENSING METHOD

[75] Inventors: David Peters, Westminster; Jeff Harth, Tustin, both of Calif.

[73] Assignee: Silicon Systems, Inc., Tustin, Calif.

[21] Appl. No.: 610,103

[22] Filed: Nov. 7, 1990

Related U.S. Application Data

[63] Continuation-in-part of Ser. No. 411,712, Sep. 25, 1989.

[51] Int. Cl.$^5$ ............................................. H02P 07/00
[52] U.S. Cl. ..................................... 318/254; 318/439
[58] Field of Search .................. 318/254, 254 A, 255, 318/596, 628, 661, 439, 721–723, 139, 139, 717, 718, 529, 638, 431, 685, 696

[56] References Cited

U.S. PATENT DOCUMENTS

| Re. 31,229 | 5/1983 | King | 318/254 X |
|---|---|---|---|
| 4,403,177 | 9/1983 | Weber et al. | 318/254 |
| 4,513,236 | 4/1985 | Kikukawa et al. | 318/696 |
| 4,600,868 | 7/1986 | Bryant | 318/696 X |
| 4,651,069 | 3/1987 | Pellegrini | 318/254 |
| 4,673,849 | 6/1987 | Sears et al. | 318/138 X |
| 4,738,209 | 4/1988 | Yanagi et al. | 318/696 X |
| 4,739,346 | 4/1988 | Buckley | 318/696 X |
| 4,743,815 | 5/1988 | Gee et al. | 318/254 |
| 4,745,345 | 5/1988 | Petersen | 318/254 |
| 4,900,993 | 2/1990 | Yashohara et al. | 312/254 |
| 4,922,169 | 5/1990 | Freman | 318/254 |
| 4,928,043 | 5/1990 | Plunkett | 318/254 |
| 4,929,879 | 5/1990 | Wright et al. | 318/696 |

Primary Examiner—Jonathan Wysocki
Attorney, Agent, or Firm—Hecker & Harriman

[57] ABSTRACT

A method and apparatus to commutate the drive voltages of a brushless DC motor without sensors. The present invention determines rotor position and velocity by detecting the polarity reversal of the Back-EMF of an undriven leg when compared to the transformed reference. In an extra measure of efficiency, it includes a commutation delay timing circuit for optimization of motor operation, and it minimizes the participation of a microprocessor or other microcontroller.

16 Claims, 5 Drawing Sheets

BIPOLAR OR UNIPOLAR DRIVE BACK-EMF COMMUTATION SENSING METHOD

This application is a continuation-in-part of a parent application. The parent application for "Self-Commutating, Back-EMF Sensing, Brushless DC Motor Controller," Ser. No. 07/411,712) invented by Jeff Harth and David H. Peters, was filed on Sep. 25, 1989. The parent application is presently pending. Applicant claims the benefit of the filing date of the parent application under 35 U.S.C. 120 and C.F.R. 1.78.

BACKGROUND OF THE INVENTION

1. Field of the Invention

This invention is directed at a system to provide commutation control of voltages for brushless DC motors without the use of sensors.

2. Background Art

There are methods of electronic commutation of brushless DC motors without using sensors that time-sample the back-EMF voltage of the undriven leg of a "STAR" configuration motor (a motor which uses a center tap for supply voltage connection). Instantaneous voltage samples can indicate rotor angular position. Other methods periodically cut motor current and sample the voltage across all the motor windings. The angular position of the rotor is deduced from the value of these voltages. Still other methods cut motor current and then pulse current through the various motor windings to measure the rotor inductance. The angular position of the rotor relates to rotor inductance. In all of these methods, commutation is linked to the rotor position by translating rotor position to the motor drive signals required to advance the motor into the next commutation state.

The "STAR" motor configuration samples the back-EMF across an undriven leg of a motor employing unipolar drive. This method is inefficient and has other disadvantages. The bipolar motor could be driven as two motor legs in opposite polarities, whereas the "STAR" method is unipolar and only driven in one direction. Further, time sampling of the back-EMF is employed, which may require the continuing use of a microprocessor and extensive hardware. The microprocessor is an expensive device which increases the overall commutator cost. The sampling methods alternately may depend on the use of inductive devices to sense current. These sensing devices are also expensive, and usually cannot be made on a monolithic integrated circuit.

Methods that turn off power to measure back-EMF suffer from reduced motor efficiency due to the loss of torque while the measurement takes place. No electrical force can be applied while the sampling is in progress. This inefficiency increases with motor speed. Also, methods which switch motor currents are noisy, both acoustically and electrically.

Prior art designs often require a controller, such as a microprocessor, to periodically participate in the commutation of the motor. Requiring a microprocessor during normal "at-speed" operation of the motor places a real time processing burden on the system microprocessor. The microprocessor is detained from executing other pending tasks and efficiency suffers. For example, where a single microprocessor is used to control various motors, an increased burden from each motor means a lesser ability to control a plurality of motors.

It is an objective of the present invention to provide DC commutator independent of sampling devices.

It is a further objective of the present invention to provide a DC commutator which is highly efficient.

It is still another object of the present invention to minimize acoustical and electrical noise by avoiding the switching of motor current.

It is yet another object of the present invention to provide for a DC commutation system which minimizes the participation of microprocessor or other controller during at-speed operation.

It is another objective of the present invention to provide a DC motor commutation system which maximizes the speed range of the motor.

It is still another objective of the present invention to provide a DC motor commutation system which allows operation at low voltages, including +5 volts DC.

It is yet another objective of the present invention to provide compatibility with both bipolar and unipolar modes of operation.

It is a further objective of the present invention to allow switching between bipolar and unipolar modes at any given time to optimize motor performance.

SUMMARY OF THE INVENTION

The present invention defines a system for the commutation of drive voltages for a brushless DC motor. The present invention's system is highly efficient and is independent of any sensors. It is also relatively independent of microprocessor participation. The present invention is also more general in use and applicability than prior art systems.

The present invention can be utilized with any polyphase motor having two or more phases. The present invention connects to an external motor via a number of connections equal to the number of phases in the motor. The present invention also connects to a supervising controller, such as a microprocessor, which generates the control signals used to initiate motor rotation. Once the supervising controller initiates motor start-up and the motor begins proper rotation, the invention will accelerate the motor in a manner comparable to a brush-based DC motor. No further participation of the controller is required. The motor will accelerate to a speed limited only by motor characteristics or by a speed control loop.

In the present invention, a commutation generator cyclically counts the number of commutation states and sequentially excites one of a plurality of signal lines, each of which denotes a commutation state. The operation of the entire commutator is dependent on the instantaneous signals on these signal lines. The state signal lines are inputted to the commutation logic. The commutation logic transforms the signals into appropriate drive voltages to drive a controlled motor. The control function is executed through a motor driver sub-system, whose function it is to boost the power level of an enable signal to that of a drive signal. A transformation network monitors the instantaneous voltage of the terminal of a controlled motor, and provides a reference level voltage. This reference level voltage is necessary in order to detect the polarity change of the back-EMF on any given motor winding. The polarity reversal change is detected by the back-EMF reversal comparators and edge detection in order to generate a signal which signifies that indeed, a polarity change has occured. When the polarity change occurs, it signifies an advancement from whatever commutation state the commutator is in to the subsequent commutation state. An edge filter and delay subsystem is used to transform the edge detection signal into a clock signal useful for the commutation generator discussed previously.

DETAILED DESCRIPTION OF THE PRESENT INVENTION

Introduction

Figure 1A:
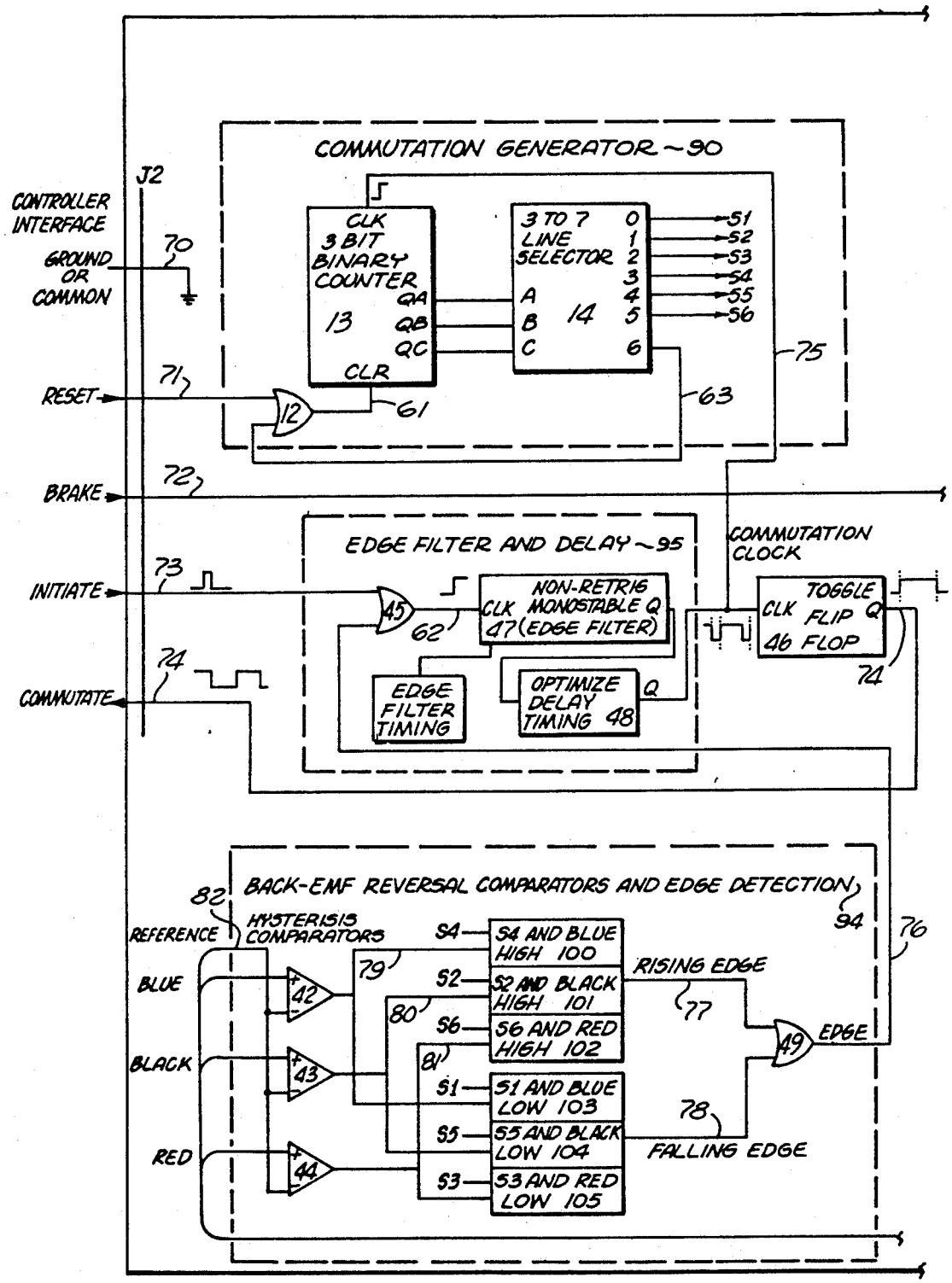
FIG. 1 is a schematic diagram of the commutator of the present invention compatible with the delta-type, Y-type, and star-type motors.

The present invention provides a commutator system for the drive voltages and currents for a DC motor. In the following description, numerous specific details are set forth such as voltage levels, signal names, etc., in order to provide a more thorough understanding of the present invention. It will be apparent, however, to one skilled in the art, that the present invention may be practiced without these specific details. In other instances, well-known circuits have not been described in detail so as not to obscure the present invention.

The present invention is a design and method for commutating the appropriate drive voltages and currents of a brushless DC motor. The commutator is able to apply the appropriate drive voltages and currents to start the motor, stabilize its speed, or stop it. When necessary, the angular position of a polyphase motor is determined by sensing the back-electromotive force (back-EMF) at one of the motor winding terminals. The commutator interacts with a controller-microprocessor at critical stages of commutator and motor operation.

A motor driver provides the power interface to the external motor. The motor driver is under control of the commutation logic and applies voltage to two motor legs at a time when in bipolar mode. Current will flow through windings between the motor leg which is driven high and the motor leg which is driven low.

For proper commutation, the commutator must be aware of the angular position of the rotor. In order to determine angular position, the commutator looks for the back-EMF that is produced when the undriven terminal voltage of the motor passes a point corresponding to a certain angular position. When the rotor passes that point, the back-EMF voltage at that terminal will reflect a positive-to-negative or negative-to-positive polarity change relative to a pseudo-reference derived either from a transformation network or from the center tap of a "STAR"-type motor due to the magnetic field within which it is spinning.

The commutator of the preferred embodiment interfaces with a microprocessor controller, a controlled motor and a power source. The preferred embodiment of the present invention includes a commutation generator, commutation logic, motor driver, edge filter and delay, transformation network, and back-EMF reversal comparators and edge detection.

The commutator has three points of connection to external sources and devices. The microprocessor interface is one. It includes a common ground connection and signal lines for "reset," "brake," "initiate," and "commutate." The commutator also connects to a polyphase motor with a connection to each winding leg of the motor. (A three-phase motor, with three windings, would have a three-wire connector to the commutator.) The commutator also connects to a power source.

Motor commutation is driven by an incrementing counter and line selector. The counter is advanced one count on each rising edge of a signal from a commutation clock. The counter automatically advances and resets. State signals, outputted from the selector, are distributed throughout the invention. The invention, when operated in bipolar drive mode, provides twice as many commutation states as there are motor phases. (e.g., for the block diagram in FIG. 1, three motor phases require six such commutation states.)

The necessary motor drive is determined from the state signals. The signals enable the upper and lower voltage source drivers, which drive motor winding legs either high or low. Appropriate logic in the commutator ensures that only one upper driver and one lower driver are enabled at any instant in time under normal motor operation.

To determine a negative-positive or positive-negative crossing, the commutator utilizes a reference voltage level produced by the transformation network. This reference level sufficiently approximates zero to enable the zero-crossing detection comparators to recognize a back-EMF polarity reversal.

The transformation network provides a neutral or common reference point for the back-EMF voltage polarity reversal event associated with commutation advancement. This network consists of impedance elements such as resistors, which form a pseudo-center tap across the motor windings (as illustrated in the detail box 93 of FIG. 1). The transformation network elements are chosen to be close in impedance value to each other and considerably large in relative value as compared to impedance of the motor windings. For "STAR"-type motors, the motor center tap can be directly used in place of the transformation network, if desired.

The present invention determines motor commutation by sensing back-EMF voltage polarity reversal in the undriven motor leg. Comparators with hysteresis compare each motor leg to the output of the transformation network. Hysteresis is provided to prevent possible comparator oscillation. The hysteresis threshold is set small enough so that the comparators remain sensitive to the back-EMF available from the motor at low speeds such as during start up, yet large enough to prevent oscillation.

The undriven leg of the motor does not have its associated motor drive enabled. Under normal motor operation in a three-phase motor, as an example, the other two motor legs will be driven. For a "Y" or "STAR" configuration motor, the differential voltage between the output of the transformation network and the undriven motor leg will be the back-EMF due to motor rotation.

In a "Delta" configured motor, a balanced bridge circuit results. Current flows through the two undriven windings. Since the motor windings are very similar in impedance, the undriven leg will be effectively centered between the upper and lower driven voltage levels. Likewise, the output of the transformation network is centered between the upper and lower driven voltage levels. The differential voltage between the transformation network output and the undriven leg is primarily due to the back-EMF voltage induced by motor rotation.

The qualification logic attached to the comparators determines which comparator to examine and to which polarity reversal edge to respond. Rising transitions are qualified in the upper block, while falling transitions are qualified in the lower block. The qualification logic utilizes the output of the commutation generator through its signal lines. Based on the commutation state, when the expected polarity reversal edge is detected, the commutation "edge" signal is generated and applied to the edge filter.

An edge filter provides a qualification pulse which rejects possible multiple transitions of the "edge" signal due to the commutation action. The edge filter may be implemented as a non-retriggerable monostable which, once triggered, remains triggered, ignoring all inputs until time expires. The "initiate" signal is merged in with the "edge" signal providing a direct means of triggering the edge filter. The external controller activates the "initiate" signal with a narrow duty cycle pulse when implementing the motor start-up procedure.

Optimization of the motor current for full speed motor operation may be implemented by adjusting the period of the time delay circuit. Polarity reversal of the back-EMF voltage occurs earlier than the optimum commutation time. Delaying the commutation clock will reduce the torque ripple and thereby optimize motor efficiency. The output of the edge filter is the input of the optimizing time delay circuit. The output of the optimizing time delay circuit is the commutation clock.

Figure 2:
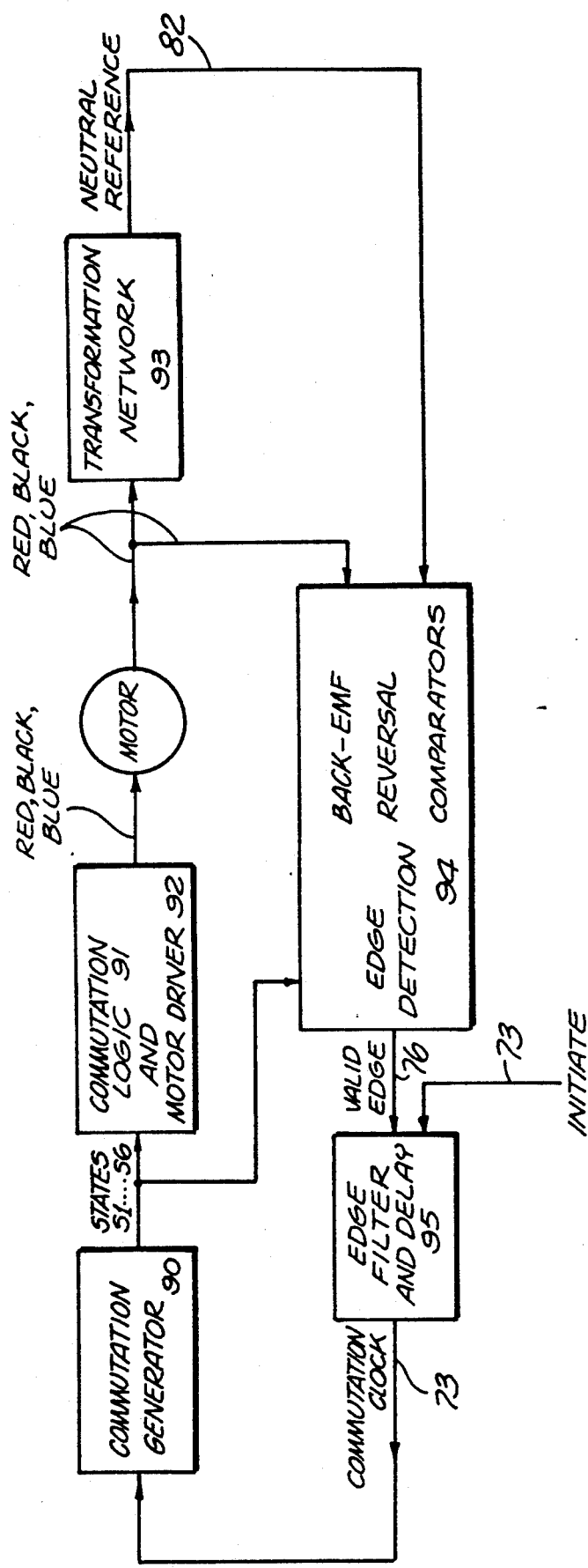
FIG. 2 is a block diagram of the commutator of FIG. 1.

FIG. 2 is a block diagram of a three-phase embodiment of the present invention. Initiate signal 73 is provided to edge filter and delay 95. Edge filter and delay 95 also receives edge signal 76 as input. Edge filter and delay 95 then outputs commutation clock 75. Commutation clock 75 is fed into commutation generator 90, whose clock it advances. Commutation generator 90 has as outputs state signals S1 through S6. These state signals are fed into commutation logic 91. States S1 through S6 are also fed to the edge qualify and select logic 94, in order to enable that logic to make a valid edge decision and appropriate edge output 76.

The motor driven by commutation logic 91 and motor driver 92 is monitored by back-EMF reversal comparators and edge detection 94 and by transformation network 93. Output 82 of transformation network 93 is a neutral reference also input into back-EMF reversal comparators. The back-EMF polarity reversal comparators and edge detection 94 generates a single signal, edge 76, the input to edge filter and delay 95.

Figure 1B:
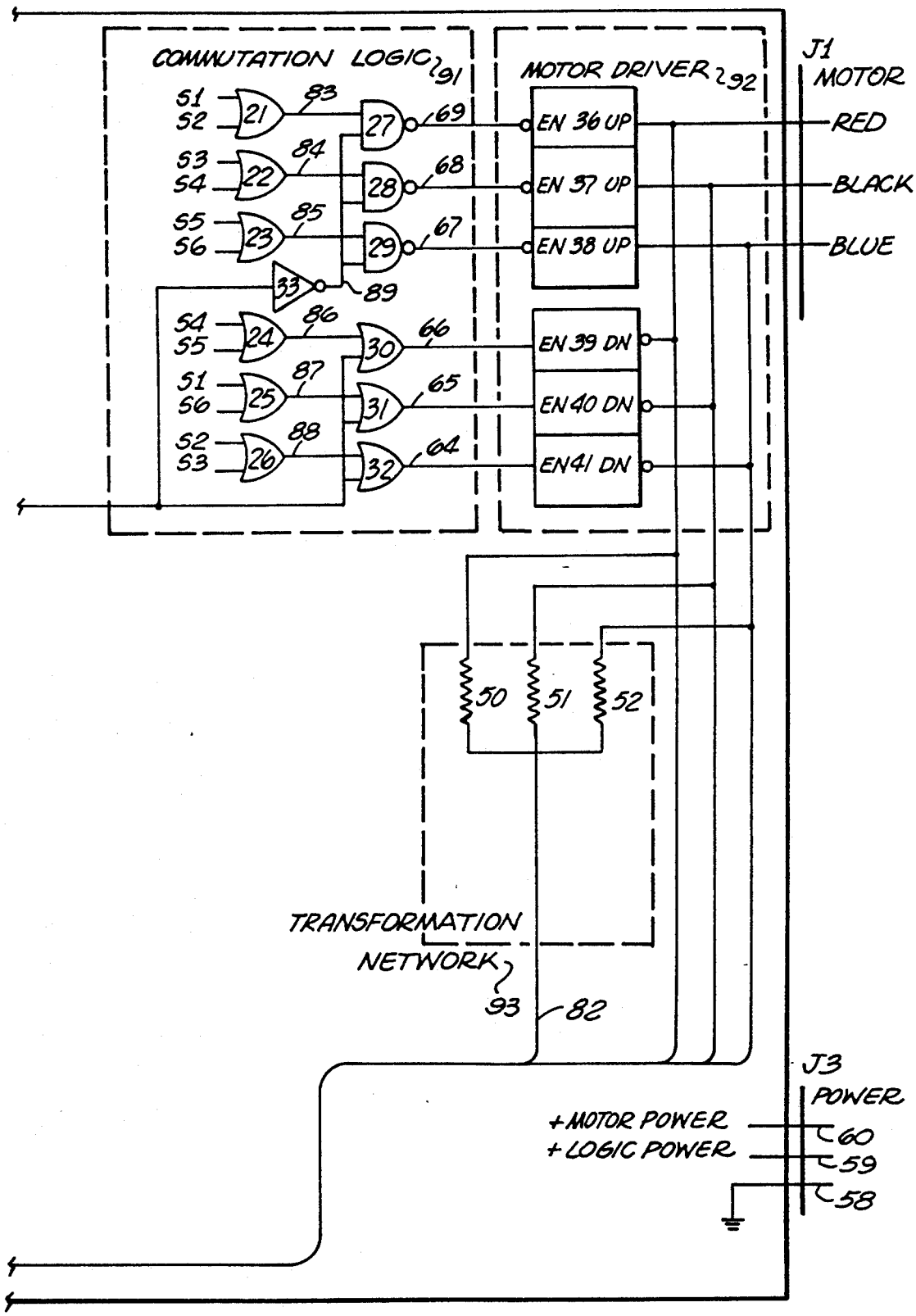

FIG. 1 is a schematic of the preferred embodiment of the present invention, a 3-phase version of a DC motor commutator. The preferred embodiment includes:
  commutation generator 90;
  commutation logic 91;
  motor driver 92;
  transformation network 93;
  back-EMF reversal comparators and edge detection 94;
  edge filter and delay 95.

Also in FIG. 1 are an internal toggle flip-flop 46, and three connectors J1, J2 and J3 used to connect the commutator to a motor, a controller and a power source, respectively.

The controller interface, J2 in FIG. 1, connects the commutator to the controller with five electrical connections. There is ground connection 70, reset signal line 71, brake signal line 72, initiate signal line 73, and commutate signal line 74.

The circuit elements listed above are interconnected by various signal lines. Controller interface J2, for example, has signal lines that connect to commutation generator 90, commutation logic 91, edge filter 95 and toggle flip-flop 46. Motor connector J1 connects directly into motor driver 92. Internally, the connections of motor connector J1 are read by the back-EMF reversal comparators 42-44. State signal lines S1-S6, along with the inputs from the controller interface J2 and motor connector J1, define the proper instantaneous operation of the commutator circuit.

Commutation generator 90 receives as input reset signal 71 from controller interface J2, as well as commutation clock signal 75 output from edge filter and delay 95. The outputs of commutation generator 90 are signal lines S1 through S6. The commutation generator is comprised of three-bit binary counter 13, three-to-seven line selector 14, and OR gate 12. The three outputs of counter 13, QA, QB and QC, are connected to the three inputs of line selector 14, A, B, and C. Output line 6 of selector 14 is connected to line 63, through OR gate 12 to line 61, and then to the clear signal of counter 13. Because of this connection, the counter resets after it counts to binary five. Binary six is a reset pulse via the feedback of selected line 6 of selector 14 into counter 13. Counter 13 is driven by clock signal 75, which it receives from edge filter and delay 95. Commutation clock 75 forces counter 13 to count up from binary 0 through binary 5. Counter 13 then resets itself automatically and begins again.

Commutation logic 91 receives signal lines S1 through S6 and brake signal 72 as input. Commutation logic 91 is comprised of OR gates 21-26 and 30-32, NAND gates 27, 28 and 29 and inverter 33. Commutation logic 91 in FIG. 1 has outputs 64-69. FIG. 1 represents a commutator for a three-phase motor. Signals from commutation logic 91 correspond two-to-one to the terminals of the controlled motor, i.e., commutation logic 91 has two outputs for each terminal. One output enables a driver which drives the voltage applied to that terminal up, the other signal is attached to a driver which drives the voltage attached to that terminal down. Because there are 3 terminals and each terminal must be driven in two directions (at different times), there are six outputs of commutation logic 91.

State signals S1-S6 feed into commutation logic 91 in the following manner. S1 and S2 are connected to the input terminals of OR gate 21. S3 and S4 are connected to the input terminals of OR gate 22. S5 and S6 are connected to the input terminals of OR gate 23. S4 and S5 are connected to the input terminals of OR gate 24. S1 and S6 are connected to the input terminals of OR gate 25. S2 and S3 are connected to the input terminals of OR gate 26.

Brake signal 72 feeds into inverter 33 and OR gates 30, 31 and 32. Output 89 of inverter 33 will be high when brake 72 is low, and conversely. NAND gate 27 receives output 83 of OR gate 21 and output 89 of inverter 33 as input. NAND gate 28 receives output 84 of OR gate 22 and output 89 of inverter 33 as input. NAND gate 29 receives output 85 of OR gate 23 and output 89 of inverter 33 as input. OR gate 30 receives output 86 of OR gate 24 and brake signal 72 as input. OR gate 31 receives output 87 of OR gate 25 and brake signal 72 as input. OR gate 32 receives output 88 of OR gate 26 and brake signal 72 as input. Output 69 of NAND gate 27 is low when the logical AND of output 83 and output 89 are high. Output 68 of NAND gate 28 is low when the logical AND of output 84 and output 89 are high. Output 67 of NAND gate 29 is low when the logical AND of output 85 and output 89 are high. Output 66 of OR gate 30 is high when the logical OR of output 86 and brake signal 72 are high. Output 65 of OR gate 31 is high when the logical OR of output 87 and brake signal 72 are high. Output 64 of OR gate 32 is high when the logical OR of output 88 and brake signal 72 are high.

In summary, signal line 69 is low when either S1 or S2 is high and brake signal 72 is low. Signal line 68 is low when S3 or S4 is high and brake signal 72 is low. Signal line 67 is low when S5 or S6 is high and brake signal 72 is low. Signal line 66 is high when S4, S5 or brake 72 is high. Signal line 65 is high when S1, S6 or brake line 72 is high. Signal line 64 is high when S2, S3 or brake signal 72 is high. During the normal operation of the circuit, brake signal 72 will be low so that the brake signal will have no effect on OR gates 30–32, and the inverse 89 of brake signal 72 will be high so that it will have no effect on the output of NAND gates 27–29. Also during normal operation of the circuit, only one of signal lines S1–S6 will be high at any instant. Therefore, at any instant, one of signal lines 67–69 is low and one of signal lines 64–66 is high.

Signal lines 64–69 from commutation logic 91 are connected to motor driver 92. The motor driver boosts the signals of commutation logic 91 to a higher voltage and current. It transforms any one logic signal from commutation logic 91 into a power signal suitable to drive a motor leg either to positive voltage or to negative voltage. Motor driver 92 is comprised of drivers 36–41. Each driver has an enable input. Drivers 36–38 drive voltage up; drivers 39–41 drive voltage down, when enabled. The six outputs of drivers 36–41 are connected to the three terminals of a three-phase motor. Drivers 36 and 39 are connected to motor terminal identified "Red," drivers 37 and 40 are connected to motor terminal identified "Black," drivers 38 and 41 are connected to motor terminal identified "Blue." In this way, the terminals of the controlled motor can be driven in either direction, positive or negative. The terminals are arbitrarily identified as Red, Black and Blue. Any means of identifying the terminals of a polyphase motor may be used.

Remembering that only one of signal lines 67–69 are low and only one of signal lines 64–66 are high at any instant during normal operation of the commutator, the operation of motor driver 92 can be explained. If output 69 is low, then motor driver 36 is enabled and motor tap Red is driven to a high voltage level. If signal line 68 is low, then motor driver 37 is enabled and motor tap Black is driven high. If signal line 67 is low, then motor driver 38 is enabled and motor tap Blue is driven high. If signal line 66 is high, then motor driver 39 is enabled and motor tap Red is driven to a low voltage level. If signal line 65 is high, then motor driver 40 is enabled and motor tap Black is driven to a low voltage level. If signal line 64 is driven high, then motor driver 41 is enabled and motor tap Blue is driven to a low voltage level. Because only one of signal lines 67–69 is low at any instant, and only one of signal lines 64–66 is high at any instant, only one motor terminal is driven high and only one motor terminal is driven low at any instant. Furthermore, the commutation logic 91 ensures that a single motor terminal will never be driven both high and low at the same time. The commutation logic 91 ensures that the motor terminal driven high and the motor terminal driven low are distinct.

Terminals identified as Red, Black and Blue of the motor are connected to transformation network 93. Transformation network 93 is comprised of resistors 50–52 which convert the voltages on the terminals Red, Black and Blue into a single voltage, representative of a pseudo-reference on line 82.

Back-EMF reversal comparators and edge detection 94 receives as input the three instantaneous voltages present on motor terminals Red, Black and Blue. It also receives as input the pseudo-reference on line 82 input by transformation network 93 and state signal lines S1 through S6. Back-EMF reversal detection block 94 is comprised of comparators 42–44, logic blocks 100–105, and OR gate 49. Comparators 42–44 receive as input pseudo-reference 82 outputted by transformation network 93. Each of comparators 42–44 also receives a motor terminal, Blue, Black or Red, as input. These three comparators output signals 79–81. Each signal is then fed into two of the six logic blocks contained within the Back-EMF reversal comparators and edge detection 94. Each logic function block within this circuit element receives as input a different signal line (S1 through S6). The outputs of these six function blocks are grouped into threes. The upper three are fed into more logic which derives a signal called "rising edge," the lower three in the diagram are processed to provide a signal called "falling edge". These two signals are then fed into an OR gate which is the output of the Back-EMF reversal comparator and detection block 94. Signal line 76 is called "edge."

Comparator 42 receives as input motor terminal Blue and pseudo-reference 82. Comparator 43 receives as input motor terminal Black and pseudo-reference 82. Comparator 44 receives as input motor terminal Red and pseudo-reference 82. Output 79 of comparator 42 is high when the voltage level on motor terminal Blue is greater than the voltage level on pseudo-reference 82. Output 79 of comparator 42 is low when the voltage level on motor terminal Blue is less than the pseudo-reference 82 voltage level. Output 80 of comparator 43 is high when the voltage level on motor terminal Black is greater than the voltage level on pseudo-reference 82. Output 80 of comparator 43 is low when the voltage level on motor terminal Black is less than the voltage level on pseudo-reference 82. Output 81 of comparator 44 is high when the voltage level on motor terminal Red is greater than the voltage level on pseudo-reference 82. Output 81 of comparator 44 will be low when the voltage level on motor terminal Red is less than the voltage level on pseudo-reference 82.

Output 79 of comparator 42 feeds into logic block 100 and logic block 103. Output 80 of comparator 43 feeds into logic block 101 and logic block 104. Signal line 81 feeds into logic block 102 and logic block 105. Logic block 100 also receives S4 as input. Logic block 101 also receives S2 as input. Logic block 102 also receives S6 as input. Logic block 103 also receives S1 as input. Logic block 104 receives S5 as input. Logic block 105 receives S3 as input. Logic blocks 100–105 are divided into two groups. Blocks 100–102 provide output signal 77. Logic blocks 103–105 provide output signal 78. Signal line 77 makes the transition from low to high when S4 is high and output 79 makes the transition from low to high, or when S2 is high and signal line 80 makes the transition from low to high, or, when S6 is high and signal line 81 makes the transition from low to high.

Logic blocks 103–105 output signal 78. Output 78 makes the transition from low to high when: S1 is high and signal line 79 makes the transition from high to low, or when S5 is high and signal line 80 makes the transition from high to low, or, when S3 is high and signal line 81 makes the transition from high to low. Output 77, when making the transition from low to high, signifies that the back-EMF on an appropriate motor terminal is making the transition from negative to positive.

Output 78 signifies that the back-EMF on an appropriate motor terminal is making the transition from positive to negative. The appropriateness of any rising or falling transition on a motor terminal is determined by the logic within logic blocks 100–105. The main criterion for the appropriate detection is the status of state signal lines S1–S6. Outputs 77 and 78 are input to OR gate 49. Output 76 of OR gate 49 makes the transition from low to high whenever the logical OR of outputs 77 and 78 make the transition low to high.

Signal 76 feeds into edge filter and optimizing timing delay 95. This function block also receives initiate signal 73 from controller interface J2. Edge filter and optimizing delay 95 comprises OR gate 45, edge filter timing non-retriggerable monostable 47, and optimizing timing delay monostable 48. Output Q of the optimizing timing delay monostable 48 is the output of 95. This signal, commutation clock 75, is one of the inputs to commutation generator 90 discussed earlier. Optimizing timing delay 48 provides adjustable delay from back-EMF polarity reversal detection to actual motor commutation for purposes of motor operation optimization.

Commutation clock 75 feeds into commutation generator 90, as well as toggle flip-flop 46. Toggle flip-flop 46 converts the output of the monostable, a periodic pulse waveform, into a square wave function. Output Q of toggle flip-flop 46 is commutate signal 74 of controller interface J2.

The commutator is provided with power by power connector J3 in FIG. 1. The power connection includes ground 58, a voltage at 60 which provides power for the motor, and another voltage at 59 which powers the logic of the circuit.

Figure 3:
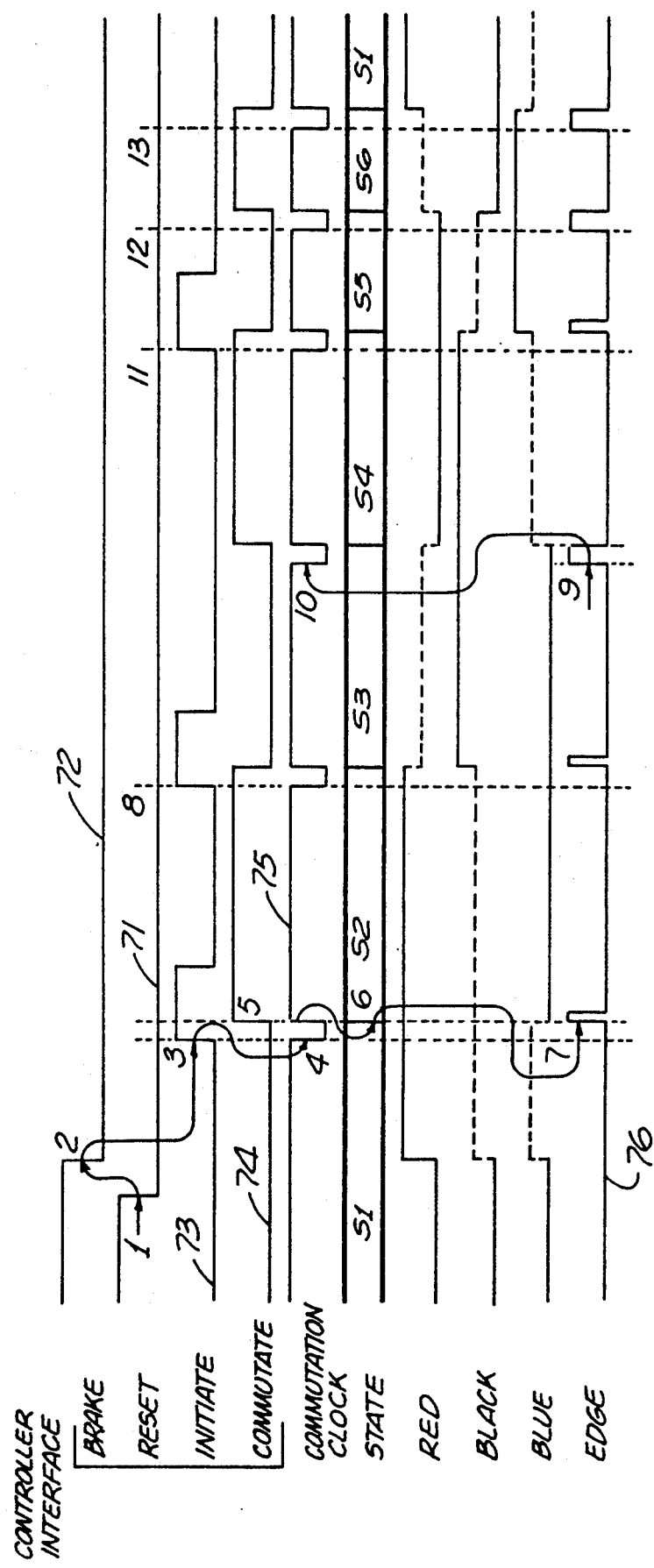
FIG. 3 is a timing diagram showing the relation between various signals relevant to the controller and the commutator of FIG. 1.

FIG. 3 is a timing diagram that illustrates the timing cycles of the controller signals, as well as certain signals within the commutator itself. FIG. 3 relates to the timing relations of a three-phase DC motor.

To start the motor, it is necessary to first reset three-bit binary counter 13 as discussed above. This will cause appropriate forces to be generated between the motor's permanent magnet and its coil which will now have current flowing through it. The magnetic field of the permanent magnet and the magnetic field of the coil are skew and exert a torque around the rotor axis, causing the rotor to align with a torque null location. To start the motor spinning, it is necessary to advance the communication state with initiate signal 73, part of connector J2 in FIG. 1. Initiate signal 73 is applied to OR gate 45, which feeds via line 62 into non-retriggerable monostable multivibrator 47. As illustrated in the timing diagram of FIG. 3, output 75 of monostable 47 pulses into counter 13 which advances counter 13, which then advances state selector 14. The motor is thus advanced for a limited number of cycles until rotor speed is such that back-EMF is generated and an edge, rising or falling, is detected. If the rising or falling edge is detectable, then the clock of counter 3 will be driven by the other input of OR gate 45, edge signal 76, via monostable 47.

On reset 71, (step 1, FIG. 3) OR gate 12 (FIG. 1) is pulsed high and back to low. When reset 71 goes high, output 61 of OR gate 12 also goes high. As output 61 of gate 12 is connected to the clear signal of three-bit binary counter 13, when output 61 of gate 12 goes high, the three-bit output of counter 13 is reset. That is, QA, QB and QC are set to binary 0. QA, QB and QC of counter 13 are directly connected to inputs A, B, and C of selector 14. Therefore, when the outputs QA, QB and QC are reset to binary 0, then output 0 of selector 14 is set high, and outputs 1 through 6 are set low. After reset signal 71 goes low, the only input to commutation generator 90 (comprised of counter 13 and line selector 14) is commutation clock 75. The function of commutation generator 90 is to then sequentially pulse state lines S1 through S6. S1 through S6 represent commutation states. In the commutation logic 91 in FIG. 1, S1 through S6 are distributed through a network of OR gates for steering. In the back-EMF reversal comparator and edge detection block 94, signals S1 through S6 are similarly distributed. The output of selector 14 is such that at any given moment, one and only one of its six outputs is high; the rest are low. After the commutator is reset, brake signal 72 is pulled low (Step 2, FIG. 3) in order to allow motor rotation.

At step 3 of FIG. 3, the initiate signal 73 is pulsed high, causing the falling edge of the commutation clock 75 (step 4). The initiate signal 73 triggers monostable 47, whose output clocks toggle flipflop 46, providing the commutate signal 74 (step 5), and driving the transition from commutation state S1 to commutation state S2 (step 6). An edge detection of the blue output (falling edge) triggers the output of edge signal 76 (step 7).

The transition from commutation state S2 to commutation state S3 at step 8 is similar to the transition from commutation state S1 to commutation state S2. However, the brake signal 72 and reset signal 71 do not undergo any transitions during commutation state S2.

At steps 9 and 10, there is no initiate signal 73 to trigger the monostable 47 and provide a commutation clock signal 75. However, an edge is detected in the back-EMF reversal comparator and edge detection block 94 and edge signal 76 is provided to the delay block 95. This triggers the monostable 47 to provide the commutation clock 75 for the transition from commutation state S3 to commutation state S4.

It is the function of commutation logic 91 in FIG. 1 to translate the signals S1 through S6 into the appropriate drive voltages that will be fed into the windings of the controlled motor.

Suppose that signal line S2 is high and signals lines S1 and S3, S4, S5 and S6 are low. Logically, outputs 83 and 88 of OR gates 21 and 26 will be high. All the others will be low. Output 83 of OR gate 21 is fed into NAND gate 27. The signal is there ANDed with the inverse of brake signal 72, signal 89. As the brake signal is low, its inverse will be high and the output of 27, the ANDing of two logical 1's, will be low (NAND function). Therefore, input line 69 to driver 36, an element of motor driver 92 in FIG. 1, will be low, which will drive output Red high. Similarly, the output 88 of OR gate 26 will be high. That signal will then be ORed with the brake signal. The output of OR gate 32 is high because input 88 is high. This enables motor driver 41 which, because of an inverter, provides an output which is low. Hence, while line Red is driven high, line Blue is driven low. Line Black, the output of motor drivers 37 and 40, will float. The correlation of a commutation state signal S1 through S6 and the status of lines Red, Black and Blue is illustrated in Table 1.

Transformation network 93 in FIG. 1 is a circuit which combines outputs Red, Black, and Blue to provide a pseudo-reference level on line 82.

TABLE 1

BACK-EMF VOLTAGE REVERSAL AND COMMUTATION

| | RED | BLACK | BLUE |
|---|---|---|---|
| Commutation state S1 ... S6 | | | |
| 1 | Drive + | Drive − | Falling |
| 2 | Drive + | Rising | Drive − |
| 3 | Falling | Drive + | Drive − |
| 4 | Drive − | Drive + | Rising |
| 5 | Drive − | Falling | Drive + |
| 6 | Rising | Drive − | Drive + |
| and repeating: | | | |
| 1 | Drive + | Drive − | Falling | where:
Drive+ means drive this leg to positive rail.
Drive− means drive this leg to ground rail.
Rising means look for negative to positive zero crossing relative to transformation network reference.
Falling means look for positive to negative zero crossing relative to transformation network reference.

Output 82 of transformation network 93 which is a pseudo-reference, as well as the Red, Black, and Blue connection lines, are fed into circuit block 94, back-EMF reversal comparator and edge detection. Hysteresis comparators 42, 43, and 44 compare the voltage on the lines Red, Black, and Blue to output 82 of transformation network 93. This comparison gives a positive signal when any of the voltages is above the pseudo-reference, and negative when the voltages are below pseudo-reference. When a certain state is indicated S1-S6, and back-EMF edge is detected, then edge signal 76, the output of circuit block 94, goes high.

Toggle flip-flop 46 is provided to convert commutation clock 75 into a toggling signal 74, by which the controller can monitor the velocity of the motor. When the controller senses independent commutation of the motor, the controller disengages and stops initiate signal 73. It then continues monitoring commutate signal 74 to check motor rotation speed.

Brake signal 72 is attached to OR gates 30–32 and through inverter 33 to NAND gates 27–29 in commutation decoder 91. When brake signal 72 is high, input 89 to NAND gates 27, 28, and 29 is low (because of inverter 33), and motor drivers 36 through 38 are disabled. When brake signal 72 is high, the input to OR gates 30, 31, and 32 is high, and so are their outputs 64–66, thus enabling motor drivers 39 through 41. The Red, Black, and Blue windings are driven low. This is an effective brake on the motor.

Although motors operated in the bipolar mode have many desirable characteristics, such as lower torque ripple resulting from more commutation states and higher efficiency resulting from multiple driven windings, bipolar operation also results in higher back EMF values, which may act to limit the maximum speed of the motor. While the increased efficiency of bipolar operation allows the higher back EMF values to be overcome at higher supply voltages such as 12 volts, the back EMF can limit motor speed at lower supply voltages, such as 5 volts.

In bipolar operation, at any given time, one motor leg is connected to a positive supply voltage, and another motor leg is connected to a negative supply voltage (often ground). Current flows primarily through the motor windings between the motor leg which is driven high and the motor leg which is driven low. However, in unipolar operation, at any given time, the center tap is connected to one supply voltage, and one motor leg is connected to the opposite supply voltage (often ground). Current flow primarily between the center tap and the motor leg which is connected to a supply voltage at that time.

Bipolar operation, in which two motor legs are driven at any given time, requires current to flow simultaneously through two motor windings in series. By contrast, unipolar operation, in which only one motor leg at a time is driven, requires current to flow through only one motor winding at a time. Since current must flow through twice as many windings in the bipolar mode as in the unipolar mode, the total coil resistance in the bipolar mode is twice that of the unipolar mode. In attempting bipolar operation at low voltages, such as 5 volts, the low voltage, back EMF effect, and the coil resistance limit the coil current. Adequate coil current is necessary to create sufficient magnetic force to operate the motor. Because of the limited coil current, bipolar operation at low voltages may result in motor performance that is unacceptable for many applications.

One important application of low-voltage DC polyphase motors is in disk drives used for storing data. Magnetic hard disk drives typically require 3600 RPM rotation for proper operation. The reduced coil resistance and back EMF of unipolar operation allow motors operated in the unipolar mode to achieve the rotation speeds required for magnetic hard disk drives.

Unipolar operation also offers another advantage at low voltages. Bipolar operation requires the coil current to flow through two transistors in series with the windings, while unipolar operation requires the coil current to flow through only one transistor. In the bipolar mode, transistors must be used to connect and disconnect both supply voltages to the coil windings. In the unipolar mode, one supply voltage is continuously connected to the center tap, so only the other supply voltage must be switched. Transistors, even when turned on completely, do not offer perfect conduction. Silicon transistors introduce a voltage drop of approximately 0.6 volts in the "on" state. Thus, unipolar operation is advantageous at low voltages because it minimizes the voltage losses by reducing the number of transistors in series with the motor windings and the losses associated with them. Unipolar operation offers a suitable method for commutating disk drive and other motors powered by a low voltage, such as 5 volts.

Although completely unipolar or completely bipolar operation is suitable for many applications, the present invention includes a method for switching between unipolar and bipolar operation. With this switching capability, a controlling device, such as a microprocessor, can be used to select the mode of operation most suitable for a particular application at a particular time.

The electrical parameters of a motor vary as a function of the rotational speed of the motor. To initially start a motor rotating when it has not been rotating, sufficient magnetic force must be produced to overcome the rotational inertia of the rotor, the shaft and perhaps a load, such as disk platters. To overcome these physical effects with a purely unipolar motor, higher starting current would be required. However, because of power supply constraints, higher starting current cannot always be supplied. The increased efficiency of the bipolar mode, gained from powering multiple windings simultaneously, allows lower starting currents, which ease the load on the power supply.

Although the bipolar mode may be preferred for starting a motor because of its lower starting current, the higher back EMF of the bipolar mode limits the maximum rotational speed of the motor. For the reasons discussed earlier, operation in the unipolar mode may be desired once the starting process is complete. To provide all of the benefits of bipolar and unipolar operation, the present invention provides a method to switch between bipolar and unipolar operation instantaneously while the motor is in motion. Thus, a motor may be started in bipolar mode to reduce the starting current, then switched to unipolar mode to maximize the rotational speed of the motor.

Figure 4:
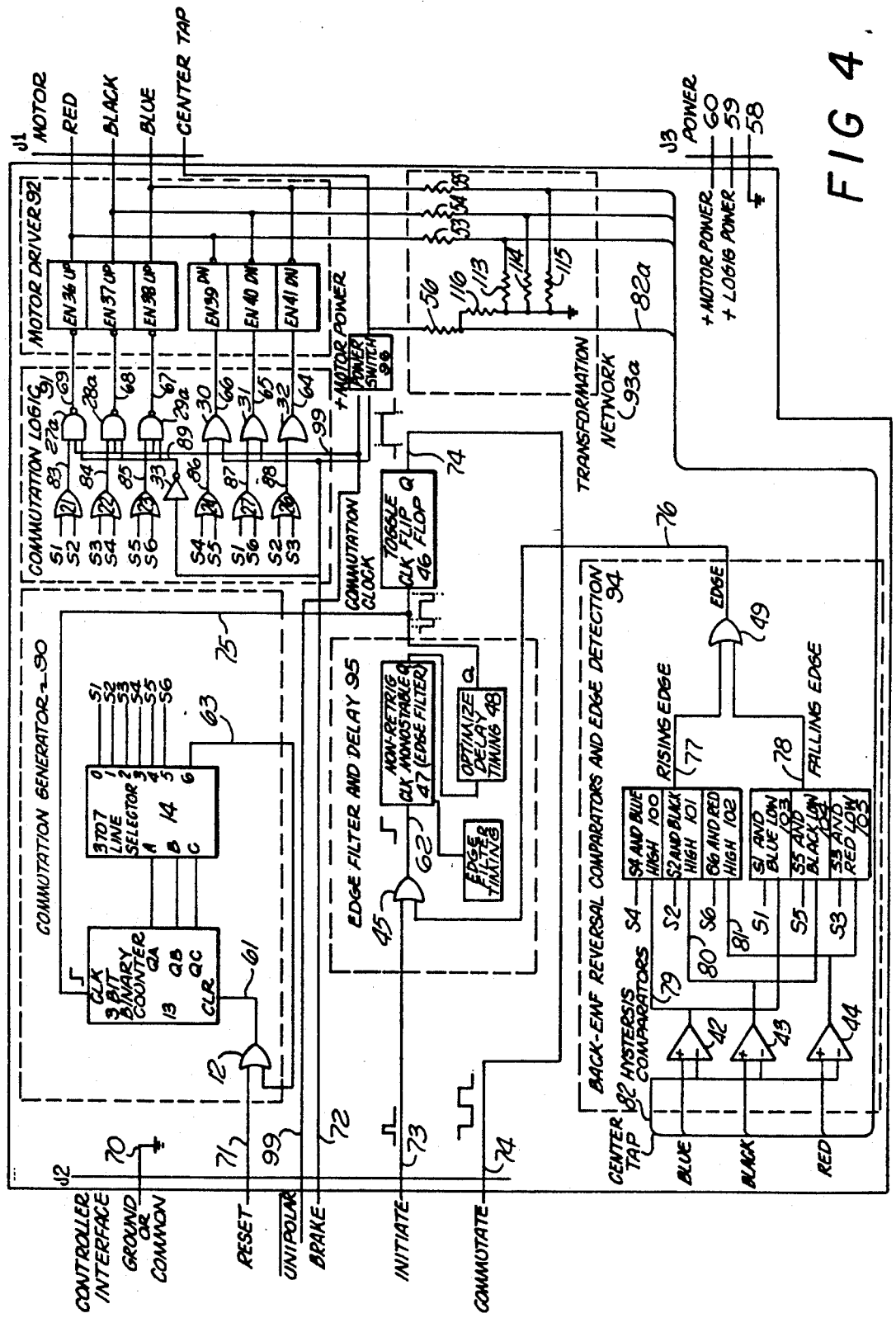
FIG. 4 is a schematic diagram of the commutator of the present invention compatible with unipolar and bipolar operation of star-type motors.

FIG. 4 illustrates an alternate embodiment of the present invention which is optimized for operating motors from low-voltage power supplies, such as +5 volts DC. The circuit in FIG. 4 is compatible with star-type motors and supports both bipolar and unipolar operation. The circuit also supports instantaneous switching between the bipolar and unipolar modes while the motor is in motion.

The alternate embodiment illustrated in FIG. 4 includes a commutation generator, commutation logic, motor driver, edge filter and delay, transformation network, back-EMF reversal comparators and edge detection, toggle flip-flop and a power switch. The commutator of the alternate embodiment interfaces with a microprocessor controller, a controlled motor and a power source.

The commutator illustrated in FIG. 4 has three points of connection to external sources and devices. The microprocessor interface (J2) is one. It includes a common ground connection and signal lines for "reset", "brake", "initiate", and "commutate". It may also include lines to select unipolar or bipolar operation, to indicate faults, or to provide power for braking or head retraction. The commutator is also connected (J1) to a polyphase motor with a connection to each winding leg and to the center tap of the motor. (A three-phase motor, with three windings, would have a four wire connector to the commutator.) The commutator is also connected (J3) to a power source.

The circuit in FIG. 4 is similar to the circuit in FIG. 1 but differs in a number of ways. First, a different configuration is used for the resistive network of transformation network 93a. Resistors 53, 54, 55, 56, 113, 114, 115 and 116 are connected as voltage dividers with the voltage divider inputs coupled to the motor winding terminals and to the center tap of the motor windings and the outputs coupled to back-EMF reversal comparators 42, 43 and 44.

FIG. 4 illustrates a circuit compatible with three-phase motors. The first terminals of resistors 53, 54 and 55 are coupled to red, black and blue lines of the motor, respectively. The first terminal of resistor 56 is coupled to the center tap of the motor. The second terminals of resistors 53, 54, 55 and 56 are coupled to the first terminals of resistors 113, 114, 115 and 116, respectively, and to the red, black, blue and center tap inputs, respectively, of back-EMF reversal comparator and edge detection block 94.

The red input of back-EMF reversal comparator and edge detection block 94 is coupled to the non-inverting input of back-EMF reversal comparator 44. The black input of back-EMF reversal comparator and edge detection block 94 is coupled to the non-inverting input of back-EMF reversal comparator 43. The blue input of back-EMF reversal comparator and edge detection block 94 is coupled to the non-inverting input of back-EMF reversal comparator 42. The center tap input of back-EMF reversal comparator and edge detection block 94 is coupled to the inverting inputs of back-EMF reversal comparators 42, 43 and 44. The second terminals of resistors 113, 114, 115 and 116 are coupled to the ground reference (negative supply) voltage.

Another way in which the circuit in FIG. 4 differs from the circuit in FIG. 1 is the inclusion of power switch 96 in the circuit in FIG. 4. Power switch 96 is coupled to "+Motor Power", to the center tap of the motor, to brake signal 72 and to inputs of NAND gates 27a, 28a and 29a.

Yet another difference between the circuits in FIGS. 1 and 4 is that NAND gates 27a, 28a and 29a of the circuit in FIG. 4 are three-input NAND gates, while NAND gates 27, 28 and 29 of the circuit in FIG. 1 are two-input NAND gates.

In the circuit in FIG. 4, the third inputs of NAND gates 27a, 28a, and 29a and power switch 96 are coupled to signal 99 which is low for unipolar mode, and high for bipolar mode.

The voltage dividers formed by resistors, 53, 54, 55, 56, 113, 114, 115 and 116 of transformation network 93 allow proportional reduction of the amplitudes of the signals on the red, black, blue and center tap lines from the motor. After having been transformed by transformation network 93, the signals are compatible with the inputs of back-EMF reversal comparator and edge detection block 94.

Transformation network 93 of FIG. 4 allows compatibility with both bipolar and unipolar modes of operation.

While back-EMF reversal comparators and edge detection block 94 of the preferred embodiment, illustrated in FIG. 1, receives as input the three instantaneous voltages present on motor terminals red, black and blue and the pseudo-reference on line 82 from transformation network 93, back-EMF reversal comparators and edge detection block 94 of the alternate embodiment, illustrated in FIG. 4, receives different signals since transformation network 93a of the alternate embodiment differs from transformation network 93 of the preferred embodiment. As noted earlier, the amplitudes of the red, black and blue motor line inputs and the center tap input to back-EMF reversal comparator and edge detection block 94 of the alternate embodiment have been proportionally reduced by the voltage dividers of transformation network 93a. Thus, comparators 42, 43 and 44 compare the transformed voltages of motor lines red, black and blue to the transformed center tap voltage.

Comparator 42 receives as input the transformed voltage of motor terminal blue and the transformed voltage of the motor center tap. Comparator 43 receives as input the transformed voltage of motor terminal black and the transformed voltage of the motor center tap. Comparator 44 receives as input the transformed voltage of motor terminal red and the transformed voltage of the motor center tap.

Output 79 of comparator 42 is high when the transformed voltage level of motor terminal blue is greater than the transformed voltage level of the motor center tap. Output 79 of comparator 42 is low when the transformed voltage level of motor terminal blue is less than the transformed voltage level of the motor center tap. Output 80 of comparator 43 is high when the transformed voltage level of motor terminal black is greater than the transformed voltage level of the motor center tap. Output 80 of comparator 43 is low when the transformed voltage level of motor terminal black is less than the transformed voltage level of the motor center tap. Output 81 of comparator 44 is high when the transformed voltage level of motor terminal red is greater than the transformed voltage level of the motor center tap. Output 81 of comparator 44 is low when the transformed voltage level of motor terminal red is less than the transformed voltage level of the motor center tap.

Power switch 96 and three-input NAND gates 27a, 28a and 29a allow switching between bipolar and unipolar modes. While in bipolar mode, power switch 96 disconnects "+Motor Power" from the center tap of the motor and drives the third inputs of NAND gates 27a, 28a and 29a high to enable operation of motor drivers 36, 37 and 38. In the bipolar mode, the motor is connected to its positive drive voltage by motor drivers 36, 37 and 38, and to its negative drive (ground) voltage by motor drivers 39, 40 and 41. Commutation generator 90 and commutation logic 91 control motor drivers 36, 37, 38, 39, 40 and 41.

However, in the unipolar mode, power switch 96 connects "+Motor Power" to the center tap of the motor and drives the third inputs of NAND gates 27a, 28a and 29a low to inhibit operation of motor drivers 36, 37 and 38. In the unipolar mode, the motor is continuously connected to its positive drive voltage by power switch 96, and only the negative drive (ground) voltage is switched by motor drivers 39, 40 and 41. Commutation generator 90 and commutation logic 91 control motor drivers 39, 40 and 41.

Power switch 96 may utilize (as an example) a P-channel power MOSFET transistor to control the connection and disconnection of the center tap of the motor to "+Motor Power".

Although the transformation network of FIG. 1 may, under certain circumstances, be replaced by a direct connection to the center tap of a star-type motor for operation in the bipolar mode, the transformation network of FIG. 4 may be used if compatibility with both the bipolar and unipolar modes is desired.

The operation of commutation logic 91a of FIG. 4 differs from the unipolar operation of commutation logic 91 of FIG. 1 because of the additional input from signal 99 and power switch 96. In FIG. 4, states signals S1-S6 from commutation generator 90 are connected to the same inputs of OR gates 21, 22, 23, 24, 25 and 26 as in FIG. 1.

Brake signal 72 is still connected to inputs of inverter 33 and OR gates 30, 31 and 32. The outputs of inverter 33 and OR gates 21, 22 and 23 are connected to inputs of NAND gates 27a, 28a and 29a, just as the outputs of inverter 33 and OR gates 21, 22 and 23 are connected to inputs of NAND gates 27, 28 and 29 in FIG. 1. The outputs of OR gates 30, 31 and 32 are still connected to lower motor drivers 39, 40 and 41. The outputs of NAND gates 27a, 28a and 29a are connected to upper motor drivers 36, 37 and 38, just as the outputs of NAND gates 27, 28 and 29 are connected to upper motor drivers 36, 37 and 38 in FIG. 1.

Output 89 of inverter 33 is high when brake 72 is low, and conversely. Output 69 of NAND gate 27a is low when the logical AND of output 83, signal 99 and output 89 is high. Output 68 of NAND gate 28a is low when the logical AND of output 84, output 99 and output 89 is high. Output 67 of NAND gate 29a is low when the logical AND of output 85, output 99 and output 89 is high. Output 66 of OR gate 30 is high when the logical OR of output 86 and brake signal 72 is high. Output 65 of OR gate 31 is high when the logical OR of output 87 and brake signal 72 is high. Output 64 of OR gate 32 is high when the logical OR of output 88 and brake signal 72 is high.

In summary, signal line 69 is low when either S1 or S2 is high and output 99 is high and brake signal 72 is low. Signal line 68 is low when S3 or S4 is high and output 99 is high and brake signal 72 is low. Signal line 67 is low when S5 or S6 is high and output 99 is high and brake signal 72 is low. Signal line 66 is high when S4, S5 or brake signal 72 is high. Signal line 65 is high when S1, S6 or brake signal 72 is high. Signal line 64 is high when S2, S3 or brake signal 72 is high.

During normal operation of the circuit, brake signal 72 will be low so that the brake signal will have no effect on OR gates 30-32, and the inverse of brake signal 72, which is output 89, will be high so that it will have no effect on the output of NAND gates 27a-29a. Also, during normal operation of the circuit, only one of signal lines S1-S6 will be high at any instant. Therefore, at any instant, except during braking or unipolar operation, one of signal lines 67-69 is low and one of signal lines 64-66 is high.

During braking, brake signal 72 becomes high, causing outputs 64, 65 and 66 to become high, regardless of the states of outputs 86, 87 and 88. With outputs 64, 65 and 66 high, motor lines red, black and blue are driven low by motor drivers 39, 40 and 41. When brake signal 72 is high, output 89 of inverter 33 is low. When output 89 is low, outputs 67, 68 and 69 are high, regardless of the state of outputs 83, 84, 85 and 99. With outputs 67, 68 and 69 high, motor drivers 36, 37 and 38 are inhibited from driving motor lines red, black or blue high. Thus, during braking, all motor windings are driven low, short-circuiting them and braking the motor.

During unipolar operation, signal 99 to power switch 96 is driven low, causing outputs 67, 68 and 69 to be high and inhibiting motor drivers 36, 37 and 38 from driving motor lines red, black or blue high. In the unipolar mode, the motor is driven high at the center tap by power switch 96, not at motor lines red, black and blue by motor drivers 36, 37 and 38 as in the bipolar mode.

When the alternate embodiment illustrated in FIG. 4 is operating in the bipolar mode, only one of signal lines 67-69 is low, and only one of signal lines 64-66 is high at any instant during normal operation. If output 69 is low, then motor driver 36 is enabled and motor tap red is driven high. If signal line 68 is low, then motor driver 37 is enabled and motor tap black is driven high. If signal line 67 is low, then motor driver 38 is enabled and motor tap blue is driven high. If signal line 66 is high, then motor driver 39 is enabled and motor tap red is driven low. If signal line 65 is high, then motor driver 40 is enabled and motor tap black is driven low. If signal line 64 is driven high, then motor driver 41 is enabled and motor tap blue is driven low. Because only one of signal lines 67–69 is low at any instant, and only one of signal lines 64–66 is high at any instant, only one motor terminal is driven high, and only one motor terminal is driven low at any instant. Furthermore, commutation logic 91a ensures that a single motor terminal will never be driven both high and low at the same time. Commutation logic 91a ensures that the motor terminal driven high and the motor terminal driven low are distinct.

The alternate embodiment of FIG. 4 operates differently in the unipolar mode. During normal unipolar operation, only one of signal lines 64–66 is high at any instant, signal lines 67–69 are all continuously high, and the motor center tap is held continuously high by power switch 96. Since signal lines 67–69 are continuously high, motor taps red, black and blue are never driven high during normal unipolar operation. If signal line 66 is high, then motor driver 39 is enabled and motor tap red is driven low. If signal line 65 is high, then motor driver 40 is enabled and motor tap black is driven low. If signal line 64 is driven high, then motor driver 41 is enabled and motor tap blue is driven low. Because only one of signal lines 64–66 is high at any instant, only one motor terminal is driven low at any instant. Since high motor drivers 36–38 are inhibited, and motor legs red, black and blue are never driven high during normal unipolar operation, it is impossible for the same motor leg to be driven both high and low at the same time.

FIG. 3, which illustrates the timing cycles of signals related to the preferred embodiment illustrated in FIG. 1, also illustrates the timing cycles of signals related to bipolar operation of the alternate embodiment illustrated in FIG. 4. However, the timing and signals shown in FIG. 3 do not correspond to unipolar operation of the alternate embodiment.

The normal bipolar operation of the alternate embodiment of FIG. 4 is described below. Suppose that signal line S2 is high and signal lines S1, S3, S4, S5 and S6 are low. Logically, outputs 83 and 88 of OR gates 21 and 26 will be high. Outputs 84, 86, 86 and 87 of OR gates 22, 23, 24 and 25 will be low. Output 83 of OR gate 21 is fed into NAND gate 27a. NAND gate 27a produces output 69, which is the inverse of the logical AND of output 83, output 99, and the inverse of brake signal 72, signal 89. Since brake signal 72 is low during normal operation, its inverse, signal 89, will be high. Output 99 will be high during bipolar operation. As signal 89 and output 99 will be high, the output of NAND gate 27a, the ANDing of three logical 1's followed by inversion, will be low. Therefore, input line 69 to motor driver 36, which is an element of motor driver block 92 in FIG. 4, will be low, which will drive motor line red high.

Similarly, output 88 of OR gate 26 will be high. OR gate 32 produces output 64, which is the logical OR of output 88 with brake signal 72. Thus, output 64 will be high since output 88 is high. As output 64 is high, motor driver 41 drives motor line blue low. Motor line black, connected to the outputs of motor drivers 37 and 40, will float. The correlation of commutation state signals S1 through S6 and the status of motor lines red, black and blue for bipolar operation is illustrated in Table 1.

The normal unipolar operation of the alternate embodiment of FIG. 4 is described below. Suppose that signal line S2 is high and signal lines S1, S3, S4, S5 and S6 are low. Logically, outputs 83 and 88 of OR gates 21 and 26 will be high. Outputs 84, 85, 86 and 87 of OR gates 22, 23, 24 and 25 will all be low. Output 83 of OR gate 21 is fed into NAND gate 27a. NAND gate 27a produces output 69, which is the inverse of the logical output 83, AND of output 99, and the inverse of brake signal 72, signal 89. Since brake signal 72 is low during normal operation, its inverse, signal 89, will be high. Output 99 will be low during unipolar operation. As signal 89 is high, but output 99 is low, the output of NAND gate 27a, the ANDing of two logical 1's and a logical 0, followed by inversion, will be high. Therefore, input line 69 to motor driver 36, which is an element of motor driver block 92 in FIG. 4, will be high, which will inhibit motor driver 36 from driving motor line red high. Similarly, motor drivers 37 and 38 will also be inhibited from driving motor lines black and blue high while output 99 is low.

At the same time, output 88 of OR gate 26 will be high. OR gate 32 produces output 64, which is the logical OR of output 88 with brake signal 72. Thus, output 64 will be high since output 88 is high. As output 64 is high, motor driver 41 drives motor line blue low. Motor lines red and black, connected to the outputs of motor drivers 36 and 39 and motor drivers 37 and 40, respectively, will float. The correlation of commutation state signals S1 through S6 and the status of motor lines red, black and blue for unipolar operation is illustrated in Table 2.

It should be noted that the present invention could be practiced as an embodiment allowing only unipolar operation with only as many commutation states as the number of phases of the motor. For example, commutation of a three-phase motor in unipolar mode could be accomplished with only three commutation states, each corresponding to driving one of motor lines red, black or blue low. However, unipolar commutation of a three-phase motor may be accomplished with the same six commutation states used for bipolar commutation by using the circuit illustrated in FIG. 4. The use of six commutation states for the unipolar commutation of a three-phase motor has the advantage of allowing both unipolar and bipolar operation. With both unipolar and bipolar operation supported, the most efficient mode may be selected at any particular moment during motor operation.

When the motor is in motion and it becomes desirable to stop the motor, braking may be used. Brake signal 72 is connected to OR gates 30–32 and through inverter 33 to NAND gates 27a–29a in commutation logic block 91a. When brake signal 72 is high, input 89 to NAND gates 27a, 28a and 29a is low (because of inverter 33), and motor drivers 36–38 are disabled. When brake signal 72, which is an input to each of OR gates 30, 31 and 32, high, outputs 64–66 are also high, enabling motor drivers 39–41. Motor drivers 39–41 drive motor lines red, black and blue low. Also, when brake signal 72 is high, power switch 96 removes "+Motor Power" from the center tap of the motor. Thus, motor drivers 36–38 and power switch 96 are inhibited from driving motor lines red, black or blue, or the center tap of the motor high. The motor then has no connection to "+Motor Power." As motor lines red, black and blue are driven low by motor drivers 36–38, all three motor windings are effectively short-circuited, resulting in the desired braking action.

TABLE 2

Back-EMF Voltage Reversal and Commutation for Alternate Embodiment in Unipolar Mode

| Commutation state S1 ... S6 | RED | BLACK | BLUE |
|---|---|---|---|
| 1 | Open | Drive − | Falling |
| 2 | Open | Rising | Drive − |
| 3 | Falling | Open | Drive − |
| 4 | Drive − | Open | Rising |
| 5 | Drive − | Falling | Open |
| 6 | Rising | Drive − | Open |
| and repeating: | | | |
| 1 | Open | Drive − | Falling | where:

Drive—means drive this leg to ground rail.

Rising means look for negative to positive zero crossing relative to transformation network reference.

Falling means look for positive to negative zero crossing relative to transformation network reference.

Open means do not drive this leg; neither drive this leg to the positive rail or ground rail nor monitor this leg for zero crossings.

Thus, a novel method and apparatus for a self-commutating back-EMF sensing, brushless DC motor controller has been described.

We claim:

1. A circuit for commutating a voltage supply of a motor, said voltage supply switchably coupled to said motor, comprising:
   detection means coupled to said motor for detecting back-EMF voltage of said motor, said detection means providing a first output signal during unipolar and bipolar operation of said motor;
   state generating means coupled to said detection means for providing a second output signal corresponding to a commutation state of said motor; and,
   translating means coupled to said second output signal for translating said second output signal into motor drive signals, said motor drive signals coupled to said motor for advancing said motor to a next commutation state and for selectably operating said motor in bipolar mode and unipolar mode.

2. The circuit of claim 1 wherein said detection means comprises a first resistive divider coupled to a center tap of said motor and at least a second resistive divider coupled to one leg of said motor.

3. The circuit of claim 1 wherein said first output signal represents rotor position of said motor.

4. The circuit of claim 1 wherein said second output signal comprises a digital word indicative of one of a plurality of commutation states of said motor.

5. The circuit of claim 1 wherein said motor drive signals comprise a drive-signal for unipolar drive and a drive+ and a drive− signal for bipolar drive.

6. A circuit for commutating a voltage supply of a motor, said voltage supply switchably coupled to said motor, comprising:
   a commutation generator circuit that receives as input a first binary waveform and outputs a first binary word of a first number of binary digits;
   a commutation decoder that decodes said binary first word output of said commutation generator and generates a second binary word composed of a second number of bits;
   a motor driver receiving said second binary word and outputting a plurality of drive signals on a plurality of output lines, said plurality of output lines being connected to a plurality of terminals on a controlled motor, said drive signals for selectably operating said motor in a bipolar mode and a unipolar mode;
   a transformation network attached to said plurality of output lines from said motor driver, said transformation network deriving a pseudo-reference voltage level from said plurality of output lines during unipolar and bipolar operation of said motor;
   a plurality of comparator circuits which compare the voltage level on each of said output lines with said pseudo-reference voltage level and output a second binary waveform dependent on the comparison of said levels; and,
   a logic circuit connected to the output of said plurality of comparators, said logic circuit deriving a third binary waveform by combining said output of said plurality of comparators with said first binary word of said commutation generator.

7. The circuit of claim 6 wherein said transformation network comprises a first resistive divider coupled to a center tap of said motor and at least a second resistive divider coupled to one leg of said motor for comparator compatibility.

8. The circuit of claim 6, wherein said commutation generator further receives a first external signal, said first external signal used to reset said commutation generator.

9. The circuit of claim 6, wherein said circuit also comprises a filter, said filter coupled to said third binary waveform said filter for receiving a second external signal, said second external signal used by said filter circuit to provide first binary waveform.

10. The circuit of claim 6, wherein said first binary waveform is connected to a conversion means which converts said first binary waveform to a third binary waveform.

11. The circuit of claim 6, wherein said third binary waveform is provided to an external controller.

12. The circuit of claim 6, wherein said commutation logic receives a third external signal, said third external signal used by said commutation logic to determine proper form of said second binary word.

13. A circuit for providing selectable unipolar and bipolar operation of a motor from a voltage supply, said motor having a center tap and a plurality of legs, comprising:
   first sensing means coupled to said center tap of said motor;
   a plurality of second sensing means coupled to said plurality of legs of said motor;
   switching means coupled to said voltage supply and to said center tap for coupling said voltage supply to said center tap for unipolar operation of said motor and for decoupling said voltage supply from said center tap for bipolar operation of said motor; and,
   said first and second sensing means providing a first output signal during unipolar and bipolar operation of said motor.

14. The circuit of claim 13 further including state generating means coupled to a detection means for providing a second output signal corresponding to a commutation state of said motor and translating means coupled to said second output signal for translating said second output signal into motor drive signals, said motor drive signals coupled to said motor for advancing said motor to a next commutation state.

15. The circuit of claim 13 wherein said first sensing means comprises a resistive divider.

16. The circuit of claim 13 wherein said second sensing means comprises a resistive divider.

* * * * *